Sept. 27, 1949.  J. SWARBRICK  2,482,947
DISPLAY DEVICE

Filed July 12, 1948  2 Sheets-Sheet 1

INVENTOR;
JOHN SWARBRICK
BY George A. Woodruff
ATTORNEY.

Sept. 27, 1949.  J. SWARBRICK  2,482,947
DISPLAY DEVICE

Filed July 12, 1948  2 Sheets-Sheet 2

INVENTOR;
JOHN SWARBRICK
BY George A. Woodruff
ATTORNEY.

Patented Sept. 27, 1949

2,482,947

UNITED STATES PATENT OFFICE 2,482,947

DISPLAY DEVICE

John Swarbrick, Nokomis, Ill.

Application July 12, 1948, Serial No. 38,340

14 Claims. (Cl. 40—137)

1

This invention relates to improvements in display means or devices for use in advertising and the like, and has particular reference to the provision of displays presenting designs or pictures, wherein the display is so constructed that the whole or any selected part or parts of a picture or design appears in motion when the point of observation is changed along a path transversely of the line of vision to the display.

An object of the invention is to provide a novel display structure embodying cooperating members each presenting a face constituting a field of view, wherein one of the members has on its face a picture or design and is apertured in one or more zones of the picture to afford a grid-like screen in each such zone, while another of said members has relatively spaced lines on its face, and wherein said members as thus constituted, are effectively related to afford viewing of the lined member through the grid screen or screens of the picture member such that when the point of observation is changed in a direction transversely of the line of vision to the display, the screened parts of the picture will appear in motion.

Another object is to provide a novel display structure of the character indicated, in which the screened zone of the picture member is so constructed as to effect in cooperation with the lined member, simulation of movements differing in direction in different portions of the screened zone.

A further object is to provide in a display structure as indicated, a predetermined grid screen construction in the picture member, or a predetermined arrangement of superposed lines on the lined member, such as will effect the simulation of opposite movements in the same area of the screened picture member.

A still further object is to afford a display device of this character, in which the grid screen of the picture member is formed as an integral part of the member.

Yet another object is to afford a display device having the characteristics hereinabove indicated, which is relatively simple and economical of construction, and which under normal daylight conditions, does not require artificial illumination for its operation.

Other objects and advantages of the invention

2 will appear from the following description of exemplary embodiments thereof shown by accompanying drawings, wherein:

Figure 1:
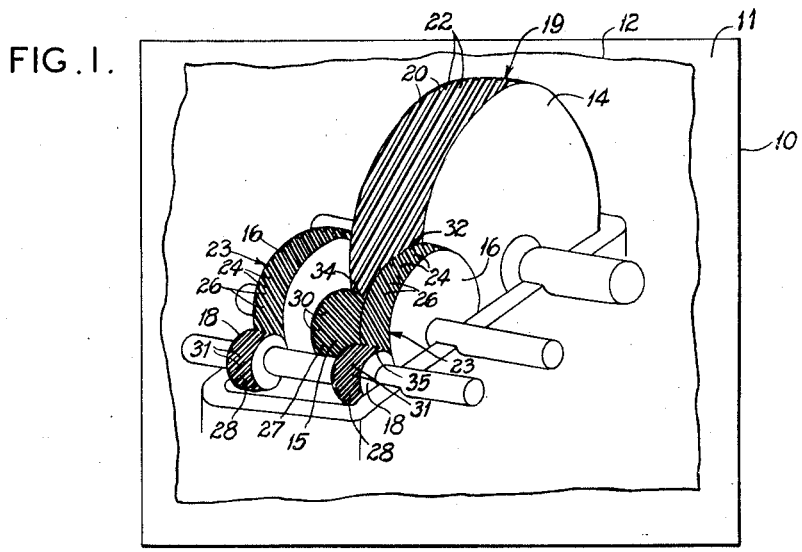
Fig. 1 is a view in front elevation, of a picture member having grid-like screens in portions of the picture.
Figure 2:
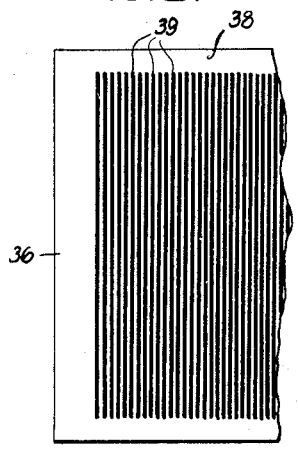
Fig. 2 is a front elevational view of a lined member for cooperation with the member of Fig. 1.
Figure 3:
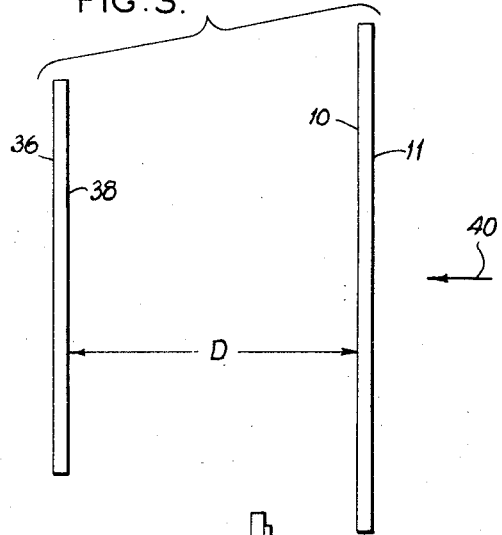
Fig. 3 illustrates in vertical side elevation, the members as shown in Figs. 1 and 2, arranged in operative relationship.

Referring first to the embodiment of the invention as shown by Figs. 1 to 3, the display structure includes a plate member 10 (Fig. 1) formed of suitable stiff material of opaque character, such as cardboard, sheet metal, or the like, and having on its face 11 a selected design or picture 12. In the present instance, the picture is that of a gear box assembly shown in perspective, and in which the upper section of the gear case is removed to reveal the connected gear train therein. The gear train here comprises a large gear 14 engaging a pinion 15, gears 16 coaxial of and adjacent the sides of pinion 15, and pinions 18 engaging the gears 16. The picture may be applied to or formed on the face 11 of member 10 in any desired manner, such that it is, preferably, a permanent part of the member.

The plate member having the picture on its face 11, then is apertured or cut away in any suitable manner, as by stamping or the like, in all exposed tooth areas of the several gears, to provide grid-like screen portions. The screen 19 substantially coextensive with the exposed area of the teeth of gear 14, comprises relatively parallel bars or strips 20 which may be of uniform predetermined width, equally spaced to afford intervening clear spaces or gaps 22 through the plate member; the exposed tooth area of each gear 16 likewise is formed to provide a screen 23, constituted by parallel bars 24 and intervening clear spaces 26, while similar screens 27 and 28 cover the exposed tooth areas of the pinion 15 and small pinions 18, respectively. It is to be noted as for a purpose to appear, that the bars 24 of each screen 23 parallel those of the other screen, while the bars of both screens 23 extend at a predetermined appreciable angle to the bars 20 of the large gear screen 19. Similarly, the bars 30 of pinion screen 27 are directed at an appreciable angle to the bars 20, and are non-parallel with respect to the bars 24 of screens 23, while the bars 31 of each pinion screen 28 are directed at a slight angle to the bars 20 of screen 19. Moreover, the bars 20 and 31 are inclined toward the right hand vertical margin of the picture (Fig. 1), while the bars 24 and 20 are oppositely inclined, as toward the left hand vertical margin of the member.

In constructing the screens as by a stamping operation or the like on the member 10, all of the bars of the several screens are integral parts of the member 10, and wherever the bars of adjacent screens meet, as at the points 32, 34 and 35 for example, the junctures are integral connections. Thus the picture member 10 including the screens, is a one-piece structure.

Fig. 2 shows a plate member 36 which is formed of a suitable stiff, non-transparent material presenting an imperforate face 38 of a high light reflective character. Formed in any suitable manner on face 38, are equally spaced parallel lines, stripes or bars 39, which may be constituted by rulings or bands on the member, each of a width which may be to a predetermined extent, greater or less than the width of the grid screen bars of picture member 10.

Figure 4:
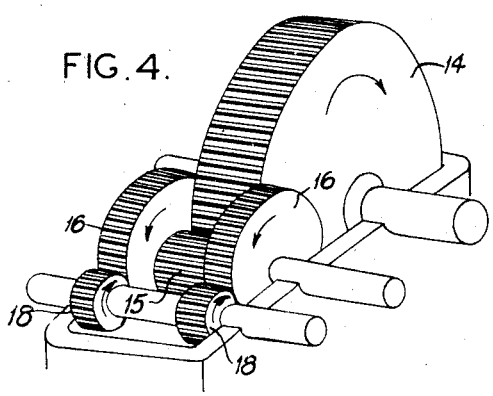
Fig. 4 is illustrative of the motion effects in the several screened parts of the picture member, which appear to an observer viewing the display.

In operation of the display device, the lined member 36 is arranged with its lines vertical, a suitable distance rearwardly of picture member 10 and in parallel therewith as shown in Fig. 3. An observer viewing the display in the direction of arrow 40 and changing the point of vision by movement to the right transversely of the line of vision, will observe moving shadow lines or bands giving the impression of gear movement as indicated in Fig. 4. In that view, the interruption of light rays produced by the relative crossing of the screen grid bars and the lines on rear plate 36, results in the simulation through moving shadow bands, of gear teeth on large gear 14, in motion in the clockwise direction indicated by arrow 42, and a like simulation of gear teeth on each of the remaining gears and pinions, with the appearance of tooth movement counterclockwise as to gears 16 and pinion 15, and clockwise as to pinions 18, all as indicated by the arrows in Fig. 4. Should the observer change the point of vision by movement to the left in a direction transversely of the line of vision to the display, rotation of the gears will appear in reverse.

The relative speeds of the gears as well as the relative directions of rotation thereof, is here determined by the number of grid bars per inch or unit length, in each screen, and the number of rulings or lines per inch or unit length, on the rear member 36. For example, assuming a given constant rate of change in one direction, of the point of observation of the display, if the grid bars of one screen and the lines of the rear member are equal in number per unit length, the speed of simulated motion in the screened area will be a maximum under the given condition. However, if the number of grid bars exceeds the number of lines on the back or secondary member, per unit length, the simulation of motion in such screened area will appear to be in one direction and at a lesser speed, in proportion to the differential of bars to lines. A lesser number of grid bars will effect a like speed result in proportion to the differential of bars to lines, but with rotation in the opposite direction. Thus in the present display device, the number of bars per unit length relative to the number of lines on the secondary member for the same unit length, may be determined in each case for the small gears or pinions and the large gears such as to produce the desired effects of higher speeds of the small gears and reversed rotations of the gears in the train.

In a display of this character, if the grid bars of a screen and the lines of the back member are parallel or approximately so, or are at a relatively small angle to each other, and the number of lines exceeds the number of grid bars per unit length, the shadow lines or bands which appear to an observer when the point of vision is changed in one direction transversely of the line of vision to the display, as to the right for example, will move in the same direction, i. e. to the right. On the other hand, the shadow lines will move oppositely to the direction of observer movement, when in this instance, the number of lines is less than the number of grid bars per unit length. This result is utilized in the modified display structure of Figs. 6 and 7 and the further modification of Figs. 9 and 10, both presently to be described. However, a similar result may be obtained independently of the relative numbers of grid bars and lines per unit length, by directing the grid bars of several sets such that one set is oppositely inclined to the other, while both are at an angle to the direction of the lines on the back member. Thus, in the embodiment of Figs. 1 to 3, the grid bars 20 of screen 19 are inclined to the right relative to the vertical lines 39 on member 36, while the grid bars 24 of screens 23 are inclined to the left relative to vertical lines 39, so that to the observer, the shadow bands of screen 19 move in one direction while the shadow bands of screens 23 move in the opposite direction.

In order to direct the shadow bands across the gear periphery in the perspective view shown (Fig. 1), such that the bands will serve to simulate gear teeth, the angle of inclination of the grid bars in each grid screen of the picture member 10, relative to the vertical lines of the back member 36, must be predetermined in constructing the screened areas so that the desired result will appear.

Figure 5:
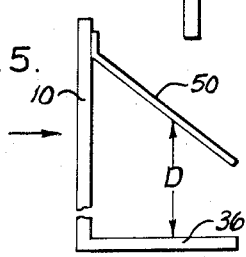
Fig. 5 illustrates in side elevation, a modified arrangement of the members of Figs. 1 and 2, wherein a mirror is employed to relate the members.

Fig. 5 illustrates an arrangement of the picture member 10 and lined member 36 wherein the latter is at the base of the assembly, extending horizontally and rearwardly from member 10. A mirror 50 mounted on the back of member 10, as shown, effectively couples the members in cooperative relationship, so that the same effects of motion in the screen grid areas of the picture obtain here as in the arrangement of Fig. 3. However, the disposition of the parts as in Fig. 5, offers greater compactness of display structure than is possible in connection with the parallel arrangement of Fig. 3.

Figure 6:
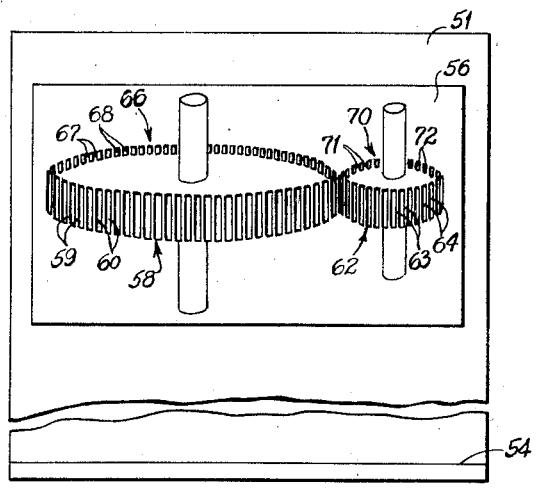
Figs. 6 and 7 illustrate in front and side elevations respectively, a modified display structure.
Figure 7:
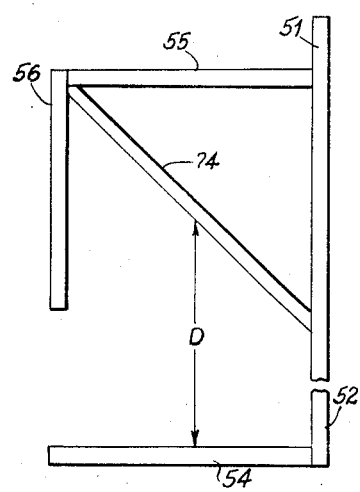
Figure 8:
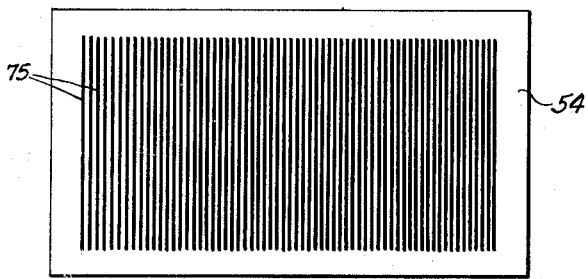
Fig. 8 shows in plan, the lined member of the modified display.

Referring now to the modification shown by Figs. 6, 7 and 8, the modified display structure comprises a vertical support 51 having in horizontal position at the lower end 52 of the support, a lined member 54 shown in plan by Fig. 8, which may be similar to the lined member 36 of the first described structure. Vertically suspended over member 54, as by a bracket 55 suitably attached to the upper end of support 51, is a picture member 56 presenting a picture of a simple gear and pinion assembly shown in deep perspective, approaching an edge view of the gears. The member is constructed to provide a grid screen 58 coextensive with the exposed tooth area of the gear, and comprising bars 59 and intervening open spaces 60. The pinion similarly is provided with a grid screen 62 affording bars 63 and intervening open spaces 64. Since in the view shown the marginal edges of the gear teeth over the under side of the gear, appear in the picture, a grid screen 66 is formed along such lower gear margin, the grid having bars 67 and intervening spaces 68. Likewise, a grid 70 comprising bars 71 and intervening open spaces 72, is formed over the lower edge of the pinion. As in the first described embodiment, the grids here are produced as integral parts of the picture member. Completing the structural elements is a mirror 74 which as in the arrangement of Fig. 5, serves to associate the picture and lined members in an operative relation.

In this embodiment, the bars 59 and 67 of the gear screens have the same direction, and are in parallel with the bars 63 and 71 of the pinion screens, while all of the bars are in substantial or approximate parallel with the lines 75 of member 54, or at a small angle to the latter. Accordingly, in order to effect the appearance of oppositely moving gears, the number of grid bars 59 per unit length is less than the number of lines per unit length, on member 54, as is the case with respect to the grid bars 71 of the pinion, while the number of grid bars 67 per unit length, exceeds the number of lines per unit length on member 54, and similarly with respect to the bars 63 of the pinion. The result as hereinbefore described, is the appearance of shadow bands moving oppositely over the screens 59 and 63, and shadow bands moving oppositely over the screens 67 and 71, to afford an accurate simulation of the gears in rotation.

The display devices hereinabove described, will operate effectively to produce the effects of motion in the screened areas of the picture, under normal daylight conditions, without the use of artificial illumination of either the picture member or the lined member. After dark or at night, the display will function satisfactorily in the artificial light of a normally or well lighted room, but if the display be mounted or located in the open, as along a highway or street, direct artificial illumination of the faces of the picture and lined members, will be required.

It is desired to point out here, that depending upon the nature of the picture embodied in the display and the motion effects to be obtained, the bars of the screened areas and/or the lines or rulings on the back member may be given a rectilinear, curved or non-linear trend, and the bars, lines, or both, may be uniformly or variously colored, as desired.

Figure 9:
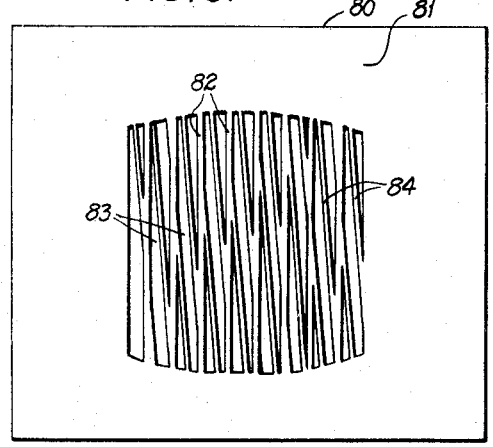
Fig. 9 shows a grid screen member for use with a lined member, as that of Fig. 10, adapted for producing the effect of movements in different directions in the same screened area of a picture.
Figure 10:
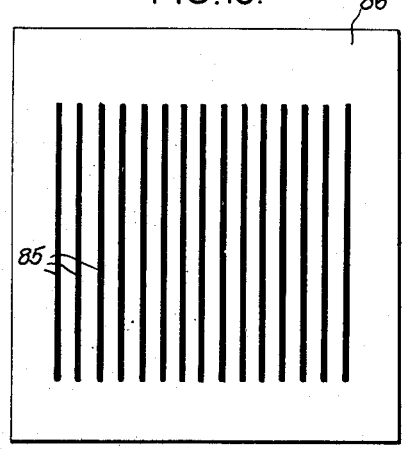
Fig. 10 illustrates a lined member which may be utilized with the grid member of Fig. 9.

Referring now to Figs. 9 and 10, a compound grid member 80 is illustrated by Fig. 9, the member being apertured in its face 81 to provide a set of relatively parallel grid bars 82, and in effect superposed thereon a second set of parallel grid bars 84 of lesser width and inclined or directed at a predetermined angle to the bars 82, such that the sets of bars cross or intersect in the manner shown. The crossed sets of bars effect irregular aperture 83, as shown. Moreover, the number of bars 84 per unit length, exceed the number of bars 82 per unit length, and are determined with respect to the lines of the lined member, as the lines 85 of the member 86 shown in Fig. 10, such that per unit length in each case, the number of bars 82 is less than the number of lines 85, while the number of bars 84 is greater than the number of lines 85. Accordingly, with the member 86 and grid member 80 arranged for example, as in Fig. 3, the result will be the appearance of moving shadow lines or bands crossing each other in opposite directions over the barred area of the screen 86. The appearance of opposing movements in the same screen area, is in consequence of the differential in the number of bars of the sets 82 and 84, to the number of lines 85, as has been described hereinbefore. It may be noted that a like result will obtain if the lined member of Fig. 10 is comprised of sets of lines compounded in the manner of the bar sets on the member of Fig. 9, while the grid member contains only a single set of bars.

In each of the embodiments shown, the relative spacing of the screened and lined members, represented by the distance D in each case, is determined by adjustment in effecting the assembled display, such as to afford a clear-cut observation of the desired effect of motion in the screened areas.

Having now disclosed my invention with respect to several exemplary embodiments thereof, it will be readily understood therefrom that the arrangement of grid screens and cooperating lines may be varied in accordance with selected pictures or designs, to obtain various effects of motion, all without departing from the spirit and intended scope of the invention as contained in the appended claims.

I claim:

1. In a display device, the combination of at least two sheet members, one of said members being formed to provide sets of grid bars and intervening openings through the member, the bars of one set and the bars of another set differing in number per unit length of area containing the bar sets, another of said sheet members having parallel lines on a face thereof, and said members being arranged such that said lines are discernible through the openings in the first said member.

2. In a display device, the combination of a pair of sheet members, one of said members being formed to provide sets of grid bars and intervening openings through the member, the other of said members having parallel lines on a face thereof, the number of bars per unit of length in one of said sets of grid bars being greater than the number of lines over a corresponding unit of length of said other member, while the number of bars per unit length in another of said sets of grid bars is less than the number of lines per unit of length of said other member, and said members being arranged such that said lines are discernible through said openings in the first said member.

3. In a display device, the combination of a pair of sheet members of opaque material, one of said members being formed to provide sets of parallel grid bars and intervening openings through the member, the bars of one set differing in number per unit length in said member from the number of bars of another set, the other of said sheet members having parallel line on a face thereof, the number of said lines per unit length on said other member being less than the number of bars per unit length in one of said sets of bars, and said members being operatively related such that said lines are discernible through said openings in the first said member.

4. In a display device of the character described, the combination of relatively spaced sheet members of opaque material, one of said members having on a face thereof a picture of a rotary element, said one member being formed to provide over an area of the rotary element displayed in the picture, parallel bars equally relatively spaced and intervening openings through the member, and another of said sheet members having equally spaced parallel lines on a face thereof, the sheet members being arranged such that said lines are discernible through the openings in said one member.

5. In a display device of the character indicated, the combination of relatively spaced sheet members of opaque material, one of said members having on a face thereof a picture illustrating in perspective, enmeshed gear elements, said member being formed to provide in an area thereof containing a peripheral portion of one gear, equally spaced parallel bars and intervening openings through the member, and in another area thereof containing a peripheral portion of the other gear, equally spaced parallel bars and intervening openings through the member, and another of said sheet members having equally spaced parallel lines on a face thereof, the sheet members being arranged such that said lines are discernible through said openings in said one member.

6. In a display device of the character indicated, the combination of a pair of sheet members of opaque material, one of said members having on a face thereof a picture illustrating in perspective, enmeshed gear elements, said member being formed to provide in an area thereof containing a peripheral portion of one gear a set of equally spaced parallel bars and intervening openings through the member, and in another area thereof containing a peripheral portion of the other gear, a set of equally spaced parallel bars and intervening openings through the member, the first said bars and the second said bars differing in number per unit length of the areas containing the bars, and the other of said sheet members having equally spaced parallel lines on a face thereof, the sheet members being arranged such that said lines are discernible through the openings in said one member.

7. A display device as set forth in claim 6, wherein the number of bars per unit length in one set of bars exceeds the number of said lines per unit length.

8. In a display device of the character indicated, the combination of a pair of sheet members of opaque material, one of said members having on a face thereof a picture illustrating in perspective, a plurality of enmeshed gear elements, said member being formed to provide in an area containing a peripheral portion of one gear element, spaced parallel bars and intervening openings through the member, wherein said bars are directed at an angle toward one margin of the member, said member further being formed to provide in an area containing a peripheral portion of another gear element, spaced parallel bars and intervening openings through the member, wherein the last said bars are directed at an angle toward a margin of the member opposite to the first said margin, and the other of said sheet members having relatively spaced parallel lines on a face thereof, said members being operatively related such that said lines are discernible through the openings in the first said member.

9. In a display device of the character indicated, the combination of a pair of sheet members of opaque material, one of said members being formed to provide relatively spaced sets of grid bars and intervening openings through the member, wherein the number of bars per unit length in one set exceeds the number of bars per unit length in another set, the other of said pair of members having distinct parallel lines on a face thereof, said members being arranged at an angle to each other, and a mirror operatively relating said members such that the lines on the last said member are viewable through said openings in the first said member.

10. In a display device of the character indicated, a sheet member of opaque material, having front and rear faces and presenting on said front face a picture illustrating rotary elements as enmeshed gears, wherein each of the rotary elements appears in perspective to show a peripheral portion thereof, said member being formed to provide a screen along the peripheral portion of each gear, comprising relatively spaced parallel bars integral with the member and intervening openings through the member, the bars of one screen and the bars of another screen being relatively oppositely inclined, and a second sheet member of opaque material, having on one face thereof distinct relatively spaced parallel lines, said members being arranged in vertical parallel with said second member a predetermined distance rearwardly of the rear face of the first said member and such that said distinct lines are vertical and are discernible through the openings of the screens in the first said member, whereby to an observer moving transversely of the line of sight to the picture on the front face of the first said member, the gears in the screened areas thereof, will appear to be in opposite rotation.

11. The subject matter of claim 10 wherein the number of bars per unit length in one screen differs from the number of bars per unit length in another screen and from the number of lines per unit length on said second member, such that the gears while appearing in opposite rotation, appear to have different rates of speed.

12. In a display device of the character indicated, a sheet member of opaque material formed to provide a screen in a given area thereof, comprising intersecting sets of bars, and apertures through the member intervening the bars of the sets, and a second sheet member of non-transparent material, having on a face thereof equally spaced lines of distinct character, the members being operatively related such that the lines of the second member are discernible through said apertures in the first said member.

13. The subject matter of claim 12, wherein said intersecting sets of bars are provided such that the number of bars per unit length in one set is greater than the number of bars per unit length in another set.

14. The subject matter of claim 12, wherein the number of lines per unit length on said second member is greater than the number of bars per unit length in one set, and less than the number of bars per unit length in another of said sets of bars.

JOHN SWARBRICK.

REFERENCES CITED

The following references are of record in the file of this patent:

UNITED STATES PATENTS

| Number | Name | Date |
|---|---|---|
| 829,492 | Spiegel | Aug. 28, 1906 |
| 956,857 | Jennings | May 3, 1910 |
| 957,119 | Spiegel | May 3, 1910 |
| 1,278,094 | Becker | Sept. 10, 1918 |
| 1,398,838 | Carver | Nov. 29, 1921 |
| 1,867,051 | Bareis | July 12, 1932 |
| 2,058,581 | Fegan | Oct. 27, 1936 |
| 2,061,309 | King | Nov. 17, 1936 |

FOREIGN PATENTS

| Number | Country | Date |
|---|---|---|
| 312,961 | Great Britain | June 4, 1929 |